US008683589B2

(12) United States Patent
Munetoh et al.

(10) Patent No.: US 8,683,589 B2
(45) Date of Patent: *Mar. 25, 2014

(54) PROVIDING PROTECTION AGAINST UNAUTHORIZED NETWORK ACCESS

(75) Inventors: Seiji Munetoh, Kanagawa (JP); Akira Ohkado, Kanagawa (JP); Yukihiko Sohda, Kanagawa (JP); Masami Tada, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/560,471

(22) Filed: Jul. 27, 2012

(65) Prior Publication Data

US 2012/0297452 A1 Nov. 22, 2012

Related U.S. Application Data

(63) Continuation of application No. 13/419,554, filed on Mar. 14, 2012.

(30) Foreign Application Priority Data

Mar. 31, 2011 (JP) ................................ 2011-078533

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC .................. 726/22; 726/23; 726/25; 726/27; 718/1; 718/108

(58) Field of Classification Search
USPC .......................... 726/3, 4, 22–27; 718/1, 108
See application file for complete search history.

(56) References Cited

U.S. PATENT DOCUMENTS

| 7,216,365 B2 * | 5/2007 | Bhagwat et al. ................ 726/23 |
| 8,060,710 B1 | 11/2011 | Don et al. |
| 8,312,468 B2 | 11/2012 | Warton et al. |
| 8,516,593 B2 * | 8/2013 | Aziz ............................... 726/24 |

(Continued)

FOREIGN PATENT DOCUMENTS

| JP | 3025820 A | 2/1991 |
| JP | 2007534039 A | 11/2007 |

(Continued)

*Primary Examiner* — Jeffrey Pwu
*Assistant Examiner* — Jayesh Jhaveri
(74) *Attorney, Agent, or Firm* — Cantor Colburn LLP; Gail Zarick

(57) ABSTRACT

A system includes a detection unit configured to detect unauthorized access to one or more information processing apparatuses that are virtually implemented by virtual machines executed by a computer; an authorized network configured to transfer authorized access to the one or more information processing apparatuses from an external network; a honeypot network configured to transfer unauthorized access to the information processing apparatuses from the external network; and a control unit configured to connect the information processing apparatuses for which no unauthorized access has been detected to the authorized network, and connect the information processing apparatuses for which unauthorized access has been detected to the honeypot network; wherein the control unit shifts, in response to detecting unauthorized access by the detection unit, the corresponding information processing apparatus into a decoy mode in which the detected unauthorized access is disconnected from a normal operation.

8 Claims, 8 Drawing Sheets

(56) References Cited

U.S. PATENT DOCUMENTS

| | | |
|---|---|---|
| 2004/0078592 A1* | 4/2004 | Fagone et al. .................. 713/201 |
| 2006/0161982 A1* | 7/2006 | Chari et al. ..................... 726/23 |
| 2008/0016570 A1 | 1/2008 | Capalik |
| 2008/0222729 A1* | 9/2008 | Chen et al. ...................... 726/24 |
| 2009/0044270 A1* | 2/2009 | Shelly et al. .................... 726/22 |
| 2009/0204964 A1* | 8/2009 | Foley et al. ....................... 718/1 |
| 2010/0077483 A1* | 3/2010 | Stolfo et al. .................... 726/24 |
| 2011/0083165 A1* | 4/2011 | Gopinath et al. ................. 726/4 |
| 2011/0321165 A1* | 12/2011 | Capalik et al. .................. 726/25 |
| 2011/0321166 A1* | 12/2011 | Capalik et al. .................. 726/25 |
| 2013/0242743 A1* | 9/2013 | Thomas et al. ............... 370/236 |

FOREIGN PATENT DOCUMENTS

| | | |
|---|---|---|
| JP | 4050253 B2 | 2/2008 |
| JP | 2008165796 A | 7/2008 |
| JP | 2008537267 A | 9/2008 |
| JP | 2009037545 A | 2/2009 |
| JP | 2010198386 A | 9/2010 |

* cited by examiner

PROVIDING PROTECTION AGAINST UNAUTHORIZED NETWORK ACCESS

CROSS REFERENCE TO RELATED APPLICATIONS

This application is a Continuation of U.S. patent application Serial No. 13/419,554, filed Mar. 14, 2012, which claims priority to Japanese Patent Application No. 2011-078533, filed 31 Mar. 2011, and all the benefits accruing therefrom under 35 U.S.C. §119, the contents of which in its entirety are herein incorporated by reference.

BACKGROUND

The present invention relates to systems, methods, and programs proving protection against unauthorized access. Computing systems providing protection against unauthorized access are known. For example, Japanese Unexamined Patent Application Publication No. 2008-537267 discloses a system using a honeypot that monitors attacks to an application.

BRIEF SUMMARY

In one embodiment, a system includes a detection unit configured to detect unauthorized access to one or more information processing apparatuses that are virtually implemented by virtual machines executed by a computer; an authorized network configured to transfer authorized access to the one or more information processing apparatuses from an external network; a honeypot network configured to transfer unauthorized access to the one or more information processing apparatuses from the external network; and a control unit configured to connect the one or more information processing apparatuses for which no unauthorized access has been detected to the authorized network, and connect the one or more information processing apparatuses for which unauthorized access has been detected to the honeypot network; wherein the control unit shifts, in response to detecting unauthorized access by the detection unit, the corresponding information processing apparatus into a decoy mode in which the detected unauthorized access is disconnected from a normal operation.

In another embodiment, a system includes a detection unit configured to detect unauthorized access to an information processing apparatus; and a control unit configured to shift, in response to detecting unauthorized access by the detection unit, the information processing apparatus into a decoy mode in which the detected unauthorized access is disconnected from a normal operation.

In another embodiment, a method for providing protection against unauthorized access to a system including one or more information processing apparatuses, an authorized network configured to transfer authorized access to the one or more information processing apparatuses from an external network, and a honeypot network configured to transfer unauthorized access to the one or more information processing apparatuses from the external network is disclosed. The method includes detecting unauthorized access to the one or more information processing apparatuses that are virtually implemented by virtual machines executed by a computer; and connecting the one or more information processing apparatuses for which no unauthorized access has been detected to the authorized network, and connecting the one or more information processing apparatuses for which unauthorized access has been detected to the honeypot network; wherein, in response to detecting unauthorized access in the detection step, the corresponding information processing apparatus is shifted into a decoy mode in which the detected unauthorized access is disconnected from a normal operation.

In another embodiment, a computer readable storage medium has computer readable instructions stored thereon that, when executed by a computer implement a method for providing protection against unauthorized access to a system including one or more information processing apparatuses, an authorized network configured to transfer authorized access to the one or more information processing apparatuses from an external network, and a honeypot network configured to transfer unauthorized access to the one or more information processing apparatuses from the external network. The method includes detecting unauthorized access to the one or more information processing apparatuses that are virtually implemented by virtual machines executed by a computer; and connecting the one or more information processing apparatuses for which no unauthorized access has been detected to the authorized network, and connecting the one or more information processing apparatuses for which unauthorized access has been detected to the honeypot network; wherein, in response to detecting unauthorized access in the detection step, the corresponding information processing apparatus is shifted into a decoy mode in which the detected unauthorized access is disconnected from a normal operation.

DETAILED DESCRIPTION

Honeypots are not needed until unauthorized access is actually made. When unauthorized access is made, honeypots can preferably deceive unauthorized accessors for a longer period. Additionally, when unauthorized access is detected, the unauthorized access can preferably be isolated more rapidly.

To solve the foregoing problems, in a first embodiment of the present invention, there is provided a system including: a detection unit configured to detect unauthorized access to one or more information processing apparatuses that are virtually implemented by virtual machines executed by a computer; an authorized network configured to transfer authorized access to the one or more information processing apparatuses from an external network; a honeypot network configured to transfer unauthorized access to the one or more information processing apparatuses from the external network; and a control unit configured to connect the one or more information processing apparatuses for which no unauthorized access has been detected to the authorized network, and connect the information processing apparatuses for which unauthorized access has been detected to the honeypot network. The control unit shifts, in response to detecting unauthorized access by the detection unit, the corresponding information processing apparatus into a decoy mode in which the detected unauthorized access is disconnected from a normal operation. A method and a program for the same are also provided.

Figure 1:
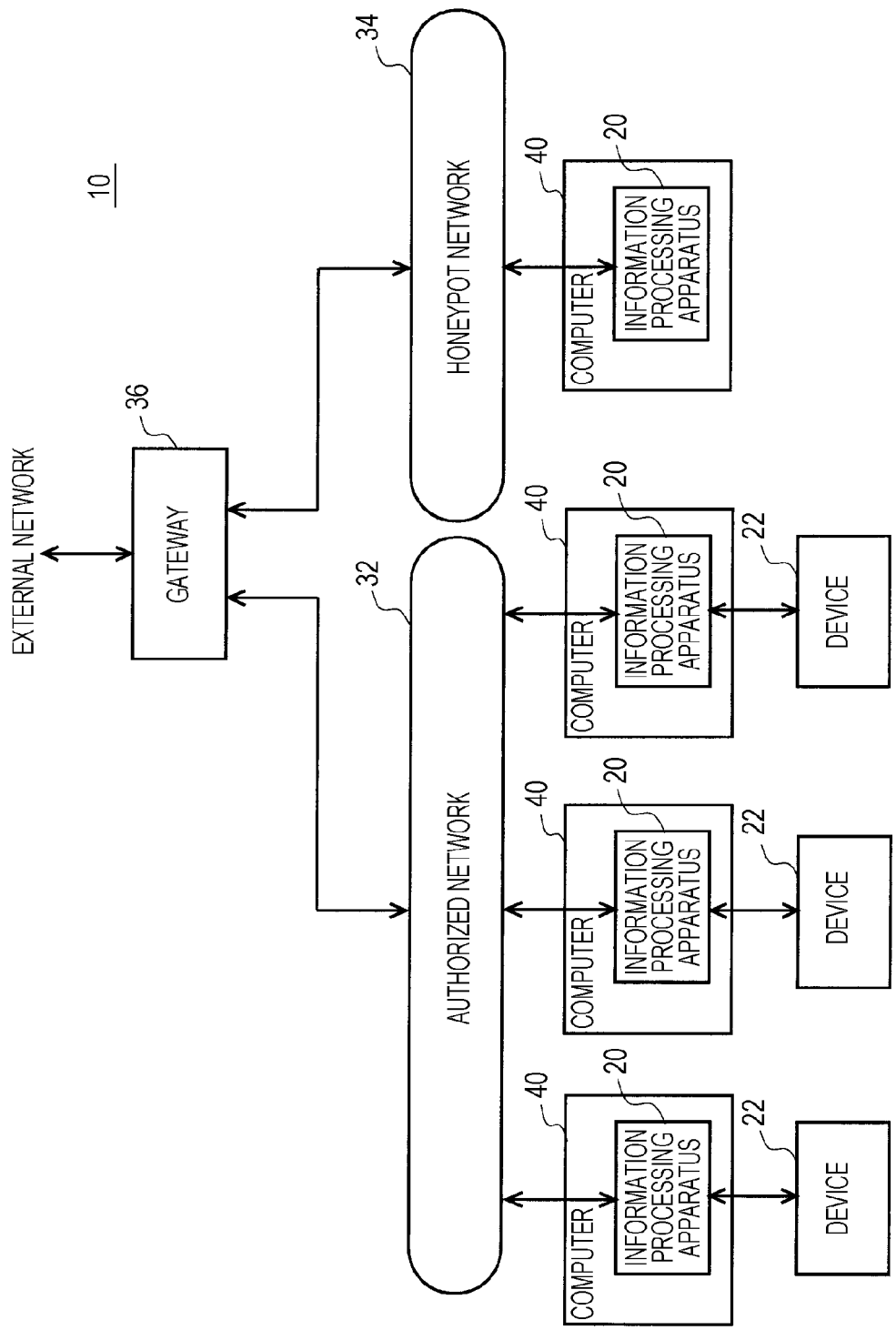
FIG. 1 illustrates a configuration of a computing system according to an embodiment.

FIG. 1 illustrates a configuration of a computing system 10 according to an embodiment. The computing system 10 according to this embodiment is, for example, an industrial control system (ICS) that manages and controls individual objects of industrial systems and infrastructure (such as traffic and energy) systems. Additionally, the computing system 10 according to this embodiment may be, for example, a system that manages various devices (e.g., telephones, copiers, etc.) connected to an office or home network. Furthermore, the computing system 10 may be a system that manages a plurality of computers connected to a company network or the like, or a system that manages many servers connected to a network, such as a data center.

The computing system 10 includes a plurality of computers 40, a plurality of devices 22, an authorized network 32, a honeypot network 34, and a gateway 36.

The plurality of computers 40 implements a plurality of information processing apparatuses 20. In this embodiment, each of the plurality of information processing apparatuses 20 is virtually implemented by a virtual machine executed by the corresponding computer 40. Each of the plurality of information processing apparatuses 20 executes programs to perform data processing, control of the corresponding device 22, and so forth.

More specifically, each of the plurality of information processing apparatuses 20 is, for example, a programmable logic controller (PLC) that controls the device 22 in accordance with execution of the programs. Additionally, the information processing apparatus 20 may be a configuration (e.g., discrete computer) that performs only data processing without performing control of the device 22.

Each of the plurality of devices 22 is controlled by the corresponding information processing apparatus 20. Each of the plurality of devices 22 is, for example, a control target in the ICS. Additionally, each of the plurality of devices 22 may be, for example, a device (e.g., telephone, copier, etc.) installed in an office or home.

The information processing apparatuses 20 free from unauthorized access are connected to the authorized network 32. The authorized network 32 transfers authorized access to the information processing apparatuses 20 from an external network. The authorized network 32 also transfers access performed between the plurality of information processing apparatuses 20 included in the computing system 10.

The information processing apparatuses 20 to which unauthorized access is made are connected to the honeypot network 34. The honeypot network 34 transfers unauthorized access to the information processing apparatuses 20 from the external network.

The gateway 36 controls routing of access to the information processing apparatuses 20 of the computing system 10 from the external network. The gateway 36 also controls routing of access to a specified computer in the external network from the information processing apparatuses 20 of the computing system 10.

Figure 2:
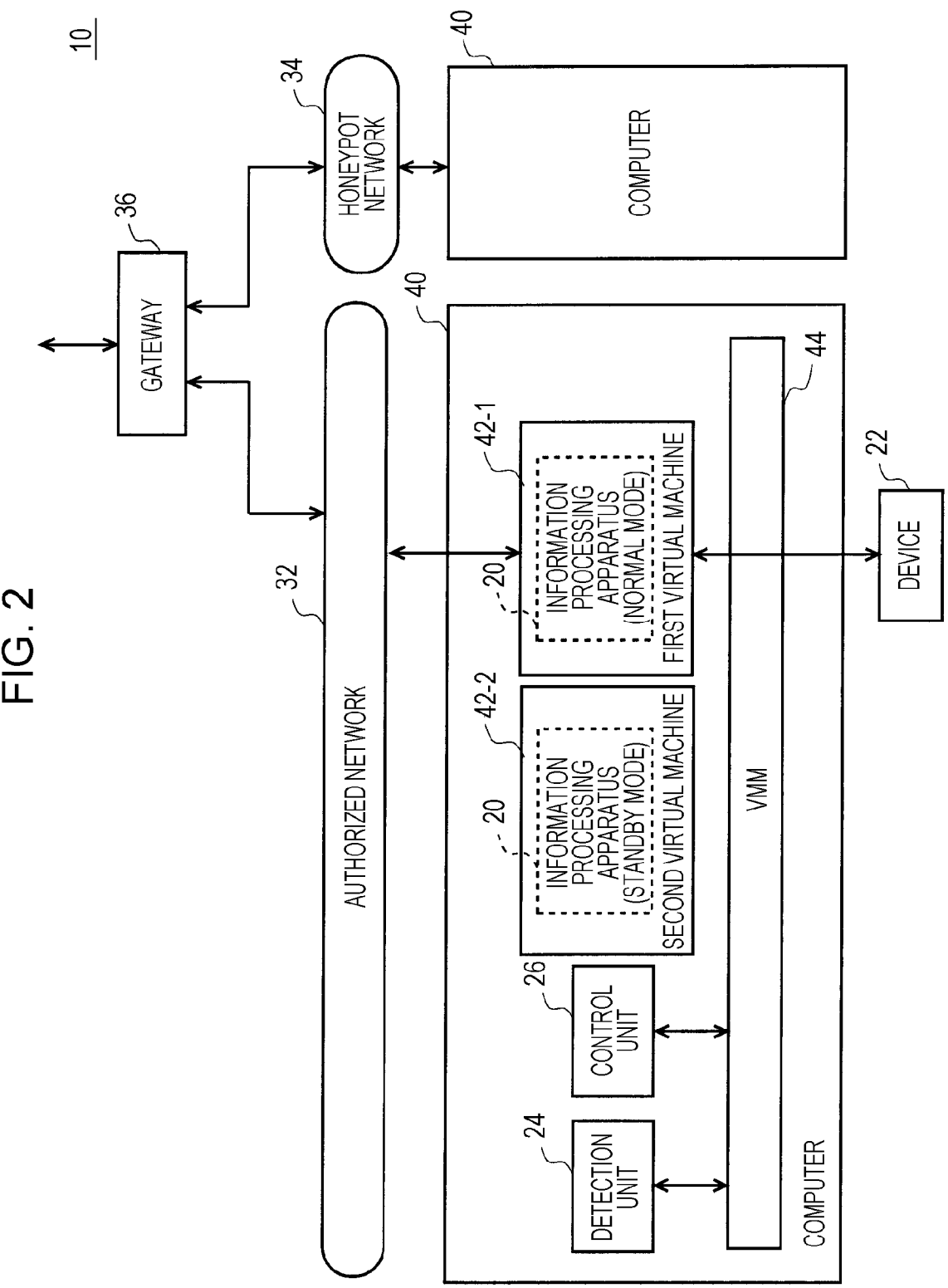
FIG. 2 illustrates a configuration of the computing system for use when there is no unauthorized access.

FIG. 2 illustrates a configuration of the computing system 10 for use when there is no unauthorized access. In this embodiment, the information processing apparatuses 20 are implemented by a plurality of virtual machines 42 executed by the computer 40. In this example, the computer 40 executes a first virtual machine 42-1 and a second virtual machine 42-2, each of which virtually implements the corresponding information processing apparatus 20. In this case, the computer 40 also executes a virtual machine manager (VMM) 44 that manages the first virtual machine 42-1 and the second virtual machine 42-2.

Additionally, the computing system 10 includes a detection unit 24 and a control unit 26. In this embodiment, the detection unit 24 and the control unit 26 are implemented in the computer 40 and connected to the virtual machine manager 44.

The detection unit 24 detects unauthorized access to the information processing apparatuses 20. Specifically, the detection unit 24 detects access made to the information processing apparatuses 20 via a network by unauthorized users. The detection unit 24 detects, for example, an action of intruding into the information processing apparatuses 20 via the network, an action of hacking information stored in the information processing apparatuses 20 via the network, an action of disturbing data processing performed in the information processing apparatuses 20 via the network, an action of destroying the information processing apparatuses 20 via the network, and so forth.

The control unit 26 controls modes of the information processing apparatuses 20. Each of the plurality of information processing apparatuses 20 operates in accordance with the mode set by the control unit 26.

The control unit 26 controls the mode of the information processing apparatus 20 implemented by each of the plurality of virtual machines 42 in the following manner. First, on a condition that no unauthorized access is made to the information processing apparatus 20 and the computing system 10 is operating normally, the control unit 26 causes the information processing apparatus 20 implemented by the first virtual machine 42-1 to operate in a normal mode and causes the information processing apparatus 20 implemented by the second virtual machine 42-2 to operate in a standby mode.

In the normal mode, the information processing apparatus 20 performs a normal operation. Specifically, in the normal mode, the information processing apparatus 20 executes a program to perform data processing based on data input to an input port. The information processing apparatus 20 operating in the normal mode then outputs data based on a result of the data processing from an output port to control operations of the device 22 or to transmit the data to the other information processing apparatuses 20.

Additionally, in the standby mode, the information processing apparatus 20 is on standby to perform data processing. Specifically, in the standby mode, the information processing apparatus 20 stops execution of a program, and stands by for receiving an instruction for shifting into the normal mode.

On a condition that no unauthorized access is made to the information processing apparatus 20 and the computing system 10 is operating normally, the control unit 26 also causes the computer 40 connected to the authorized network 32 to execute the first virtual machine 42-1 and the second virtual machine 42-2. The control unit 26 generates the information processing apparatus 20 operating in the normal mode (information processing apparatus 20 implemented by the first virtual machine 42-1) at an address in the authorized network 32. The control unit 26 further generates the information processing apparatus 20 operating in the standby mode (information processing apparatus 20 implemented by the second virtual machine 42-2) so that this information processing apparatus 20 is inaccessible from other computers or the like via the authorized network 32. In this way, the control unit 26 can connect the information processing apparatus 20 for which no unauthorized access has been detected to the authorized network 32 to allow authorized accessors to access the information processing apparatus 20.

Figure 3:
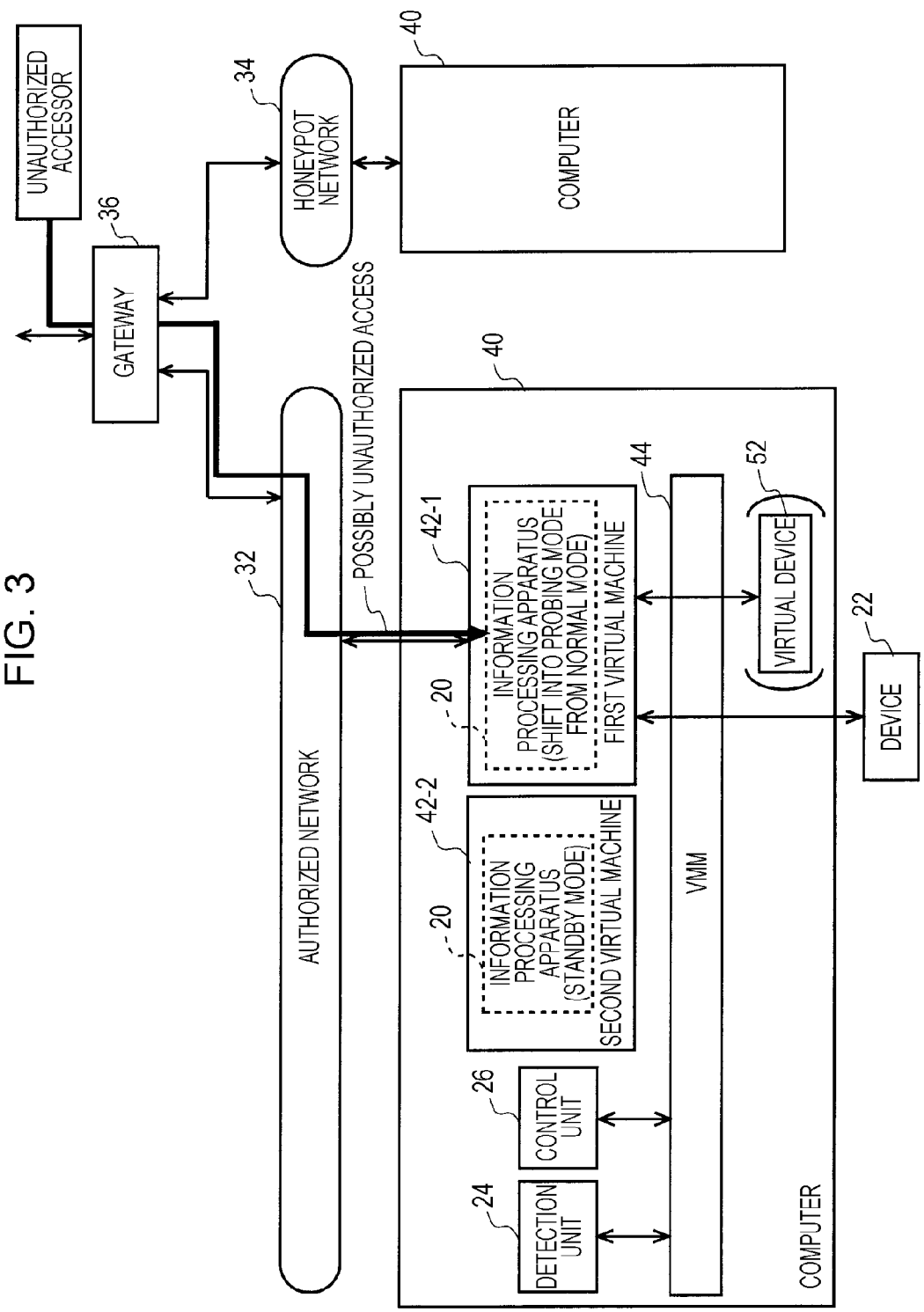
FIG. 3 illustrates a state of the computing system that shifts from the configuration for use when there is no unauthorized access into a configuration for use when unauthorized access is suspected.

FIG. 3 illustrates a state of the computing system 10 that shifts from the configuration for use when there is no unauthorized access into a configuration for use when unauthorized access is suspected.

On a condition that no unauthorized access is made to the information processing apparatus 20 and the computing system 10 is operating normally, the detection unit 24 always monitors whether unauthorized access is made to the information processing apparatus 20 implemented by the first virtual machine 42-1 and whether the unauthorized access is suspected. Here, on a condition that the unauthorized access is suspected for the information processing apparatus 20 implemented by the first virtual machine 42-1, the control unit 26 shifts the information processing apparatus 20 implemented by the first virtual machine 42-1 from the normal mode to a probing mode.

In the probing mode, the information processing apparatus 20 inputs data used in the normal operation to the input port, and performs the operation in a state where the output port is disconnectable from the normal operation. Specifically, in the probing mode, the information processing apparatus 20 inputs, to the input port, data similar to the data input to the information processing apparatus 20 operating in the normal mode, and performs data processing. In this way, the information processing apparatus 20 operating in the probing mode actually controls operations of the device 22 and transmits data to the other information processing apparatuses 20 but can be disconnected from the device 22 and the other information processing apparatuses 20 anytime once the suspected access is determined to be unauthorized access.

Additionally, the computer 40 may execute a virtual device 52 that virtually implements operations similar to those of the device 22. In this case, the information processing apparatus 20 operating in the probing mode can output the data from the output port to the virtual device 52 and control operations of the virtual device 52. In this way, the information processing apparatus 20 operating in the probing mode can make unauthorized accessors to believe that the device 22 is operating in accordance with unauthorized access and can deceive the unauthorized accessors. The information processing apparatus 20 can also detect and block unauthorized access to the device 22 by accessing the device 22 via the virtual device 52.

Figure 4:
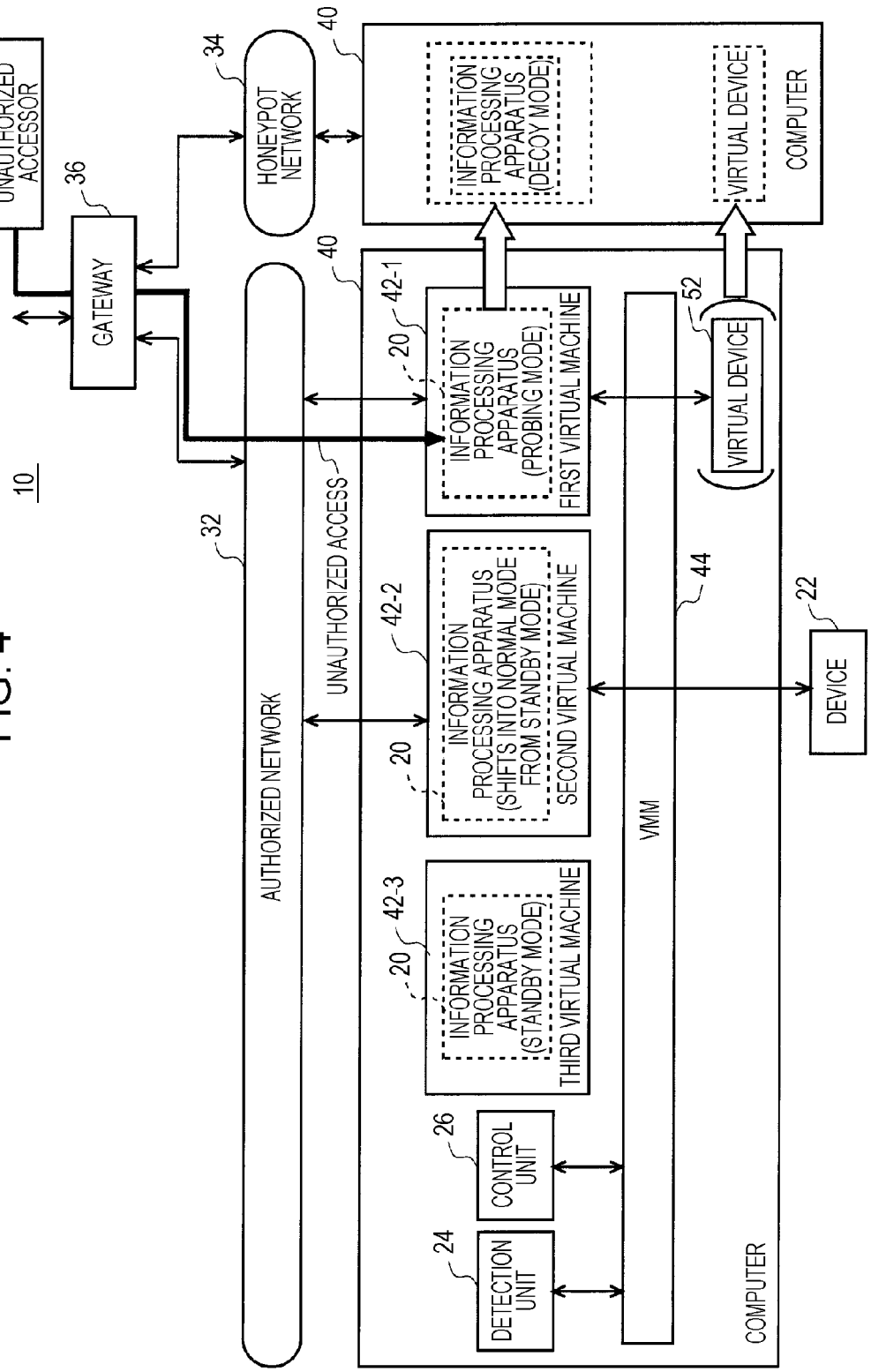
FIG. 4 illustrates a state of the computing system that shifts from the configuration for use when unauthorized access is suspected into a configuration for use when unauthorized access is detected.
Figure 5:
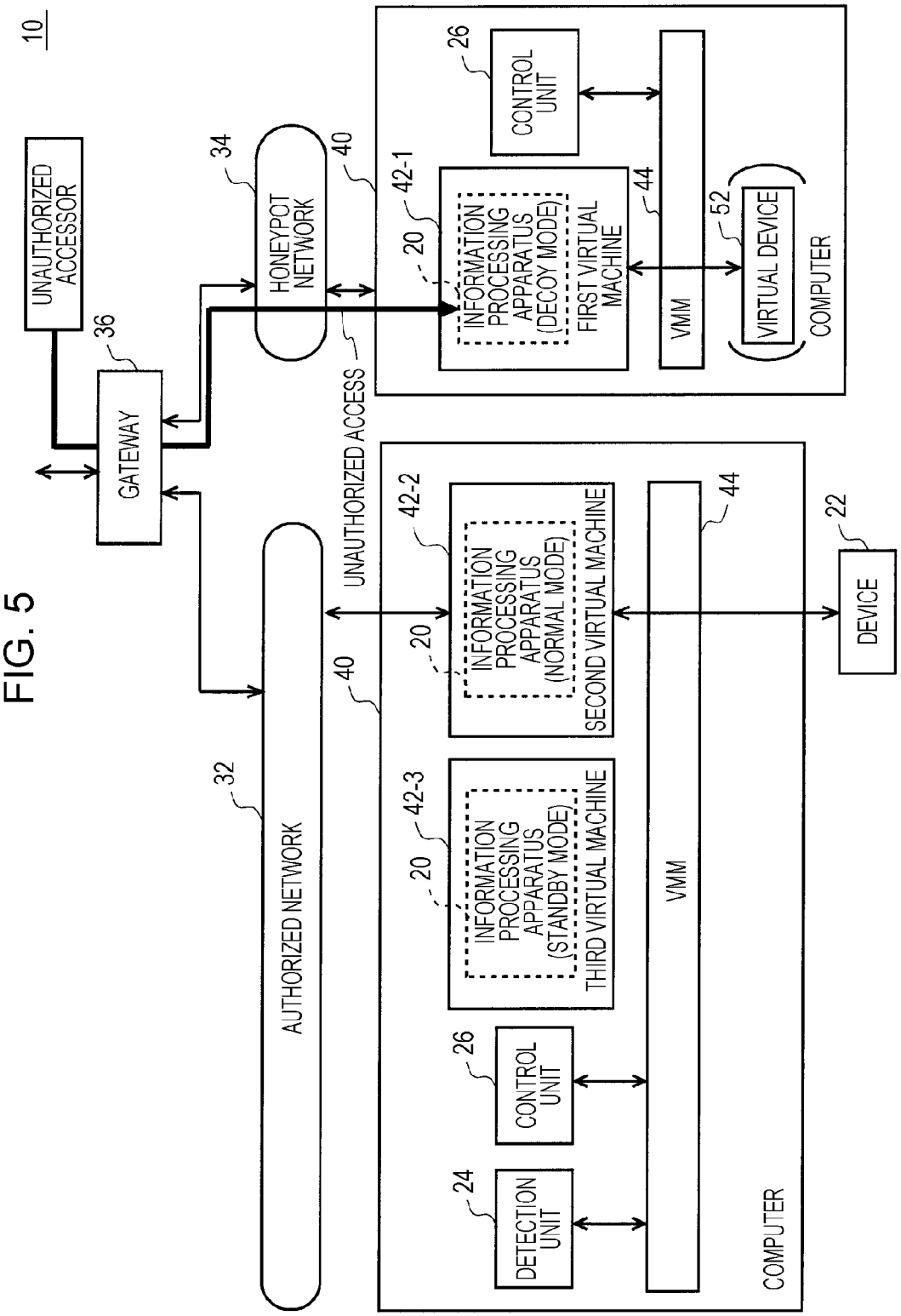
FIG. 5 illustrates a configuration of the computing system for use when unauthorized access is detected.

FIG. 4 illustrates a state of the computing system 10 that shifts from the configuration for use when unauthorized access is suspected into a configuration for use when unauthorized access is detected. FIG. 5 illustrates a configuration of the computing system 10 for use when unauthorized access is detected.

The detection unit 24 continuously monitors whether unauthorized access is made to the information processing apparatus 20 that is operating in the probing mode and implemented by the first virtual machine 42-1. As a result, if the detection unit 24 determines that no unauthorized access is made to the information processing apparatus 20 implemented by the first virtual machine 42-1, the control unit 26 shifts the information processing apparatus 20 implemented by the first virtual machine 42-1 back to the normal mode. On the other hand, if the detection unit 24 detects unauthorized access to the information processing apparatus 20 implemented by the first virtual machine 42-1, the control unit 26 shifts the information processing apparatus 20 implemented by the first virtual machine 42-1 into a decoy mode from the probing mode.

When shifting the first virtual machine 42-1 into the decoy mode, the control unit 26 also causes the second virtual machine 42-2 to operate in the normal mode, and replaces the first virtual machine 42-1 with the second virtual machine 42-2. In this case, the control unit 26 further prepares a third virtual machine 42-3 in the standby mode.

In the decoy mode, the information processing apparatus 20 performs the operation with unauthorized access being disconnected from the other apparatus performing the normal operation. Specifically, in the decoy mode, the information processing apparatus 20 inputs to the input port pseudo-data that is different from data used in the normal operation, and performs data processing. Additionally, in the decoy mode, the information processing apparatus 20 does not output data based on a result of the data processing from the output port. Specifically, the information processing apparatus 20 operating in the decoy mode does not actually control operations of the device 22 and transmit data to the other information processing apparatuses 20.

In this way, the control unit 26 can disconnect the information processing apparatus 20 for which unauthorized access has been detected so that the information processing apparatuses 20 and the devices 22 included in the computing system 10 are not affected by the unauthorized access, and can prevent correct information of the computing system 10 from being supplied to unauthorized accessors. The control unit 26 can also deceive unauthorized accessors as if the unauthorized access succeeded by giving the pseudo-data to the unauthorized accessors.

In addition, the control unit 26 causes another computer 40, which is different from the computer 40 executing the second virtual machine 42-2 that implements the information processing apparatus 20 operating in the normal mode, to execute the first virtual machine 42-1 that implements the information processing apparatus 20 operating in the decoy mode. More specifically, the control unit 26 causes the computer 40 connected to the honeypot network 34 to execute the first virtual machine 42-1 that implements the information processing apparatus 20 operating in the decoy mode. Meanwhile, when the information processing apparatus 20 is moved between the computers 40, the control units 26 of the computers 40 share the state of the moved information processing apparatus 20.

Additionally, technologies for moving a physical host without stopping execution of virtual machines have been put into practical use by many virtualization technologies, such as VMWare (trademark), for example. Here, movement of the information processing apparatus 20 is implemented by using such technologies.

Subsequently, the control unit 26 generates the information processing apparatus 20 operating in the decoy mode (information processing apparatus 20 implemented by the first virtual machine 42-1) at an address in the honeypot network 34. Specifically, the control unit 26 connects the information processing apparatus 20 for which unauthorized access has been detected to the honeypot network 34. In response to completing the movement, the control unit 26 further instructs the gateway 36 to transfer access to the first virtual machine 42-1 to the honeypot network 34 instead of the authorized network 32. In this way, the control unit 26 can isolate unauthorized access within the honeypot network 34.

The computer 40 may also execute the virtual device 52 that virtually implements operations similar to those of the device 22. In this case, the information processing apparatus 20 operating in the decoy mode can output data from the output port to the virtual device 52, and control operations of the virtual device 52. In this way, the information processing apparatus 20 operating in the decoy mode can deceive unauthorized accessors as if the device 22 were operating in accordance with unauthorized access.

Furthermore, on a condition that unauthorized access to the information processing apparatus 20 implemented by the first virtual machine 42-1 is made in the normal mode, the control unit 26 may shift the information processing apparatus 20 implemented by the first virtual machine 42-1 directly into the decoy mode from the normal mode. Specifically, the control unit 26 may shift the information processing apparatus 20 implemented by the first virtual machine 42-1 into the decoy mode from the normal mode without through the probing mode. In this way, the control unit 26 can more rapidly isolate unauthorized access within the honeypot network 34.

Figure 6:
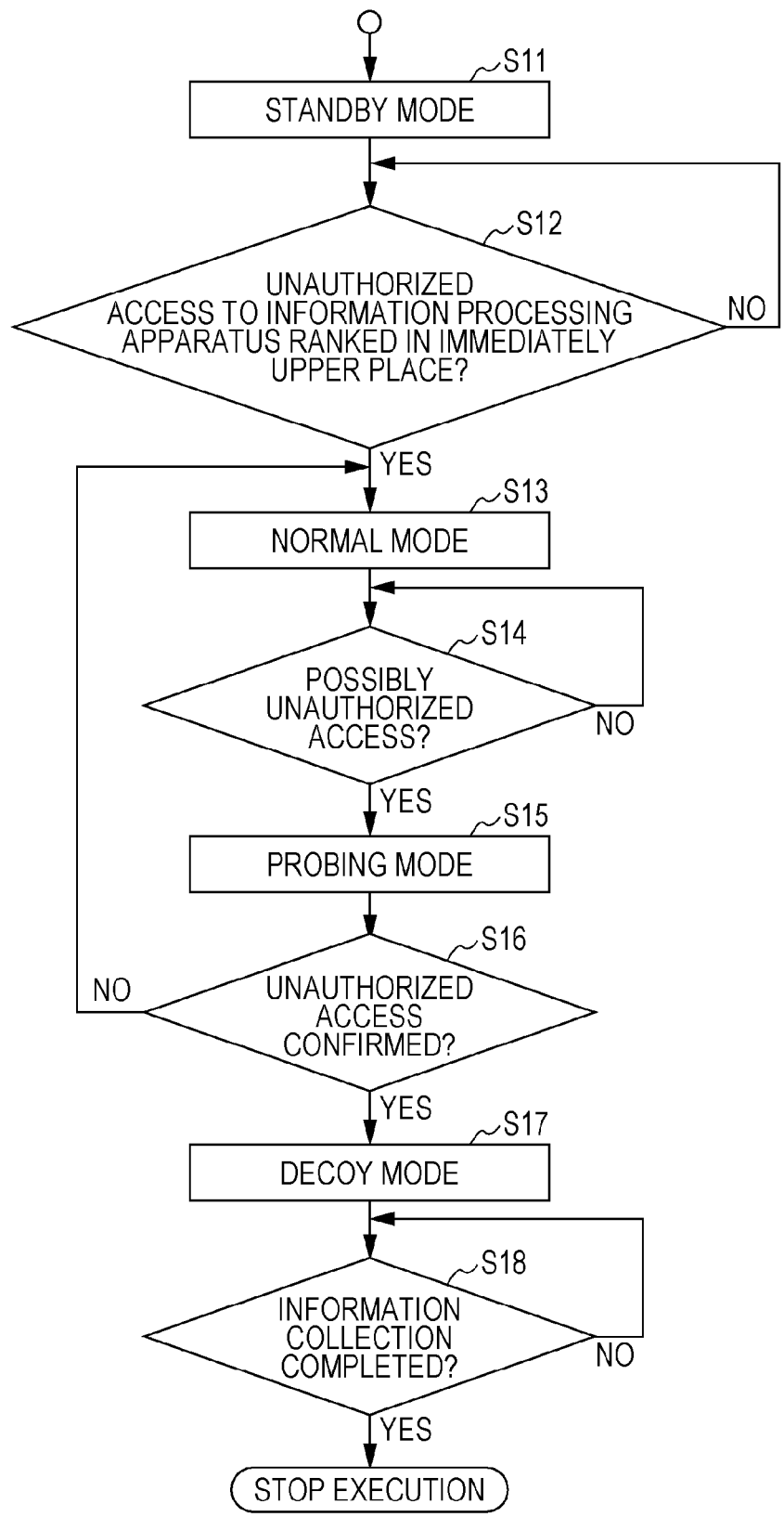
FIG. 6 is a flowchart illustrating a mode shifting flow of an information processing apparatus.

FIG. 6 illustrates a mode shifting flow of the information processing apparatus 20. The computing system 10 may implement the information processing apparatuses 20 using three or more virtual machines 42 instead of the two virtual machines 42. In this case, each information processing apparatus 20 implemented by the corresponding one of the three or more virtual machines 42 performs a process from step S11 to step S18 illustrated in FIG. 6.

First, this information processing apparatus 20 operates in the standby mode (step S11). If no unauthorized access is made to another information processing apparatus 20 ranked at the immediately upper place in the standby mode (NO in step S12), the standby mode is continued in this information processing apparatus 20. If unauthorized access is made to the other information processing apparatus 20 ranked at the immediately upper place in the standby mode (YES in step S12), this information processing apparatus 20 shifts into the normal mode (step S13).

Subsequently, if unauthorized access is not suspected for this information processing apparatus 20 in the normal mode (NO in step S14), the normal mode is continued in the information processing apparatus 20. If unauthorized access is suspected for this information processing apparatus 20 in the normal mode (YES in step S14), the information processing apparatus 20 shifts into the probing mode (step S15).

Subsequently, if it is determined that no unauthorized access is made to this information processing apparatus 20 in the probing mode (NO in step S16), the information processing apparatus 20 shifts back to the normal mode (step S13). If it is determined that unauthorized access is made to this information processing apparatus 20 in the probing mode (YES in step S16), the information processing apparatus 20 shifts into the decoy mode (step S17).

Subsequently, the information processing apparatus 20 continues execution for a predetermined period in the decoy mode (step S18). For example, the information processing apparatus 20 continues execution until unauthorized access stops. After the predetermined period has passed in the decoy mode, the information processing apparatus 20 stops execution and the process exits from this flow (YES in step S18).

As described above, the computing system 10 according to this embodiment shifts the mode of the computing system 10 in response to detecting unauthorized access, and disconnects the unauthorized access from another apparatus performing normal operations. This allows the computing system 10 to efficiently use resources since the resources are not needed until unauthorized access is detected.

Additionally, the computing system 10 according to this embodiment changes the mode of a resource to which unauthorized access is made, and disconnects the unauthorized access from another apparatus performing normal operations. This allows the computing system 10 to rapidly isolate the unauthorized access within the honeypot network 34 while deceiving unauthorized accessors, and to deceive the unauthorized accessors for a long period.

Meanwhile, the control unit 26 according to this embodiment shifts the information processing apparatus 20 from the normal mode into the probing mode, and then from the probing mode into the decoy mode. However, on a condition that unauthorized access can be detected in the normal mode for sure, the control unit 26 may shift the information processing apparatus 20 directly into the decoy mode from the normal mode. This allows the control unit 26 to isolate the unauthorized access within the honeypot network 34 more rapidly.

Figure 7:
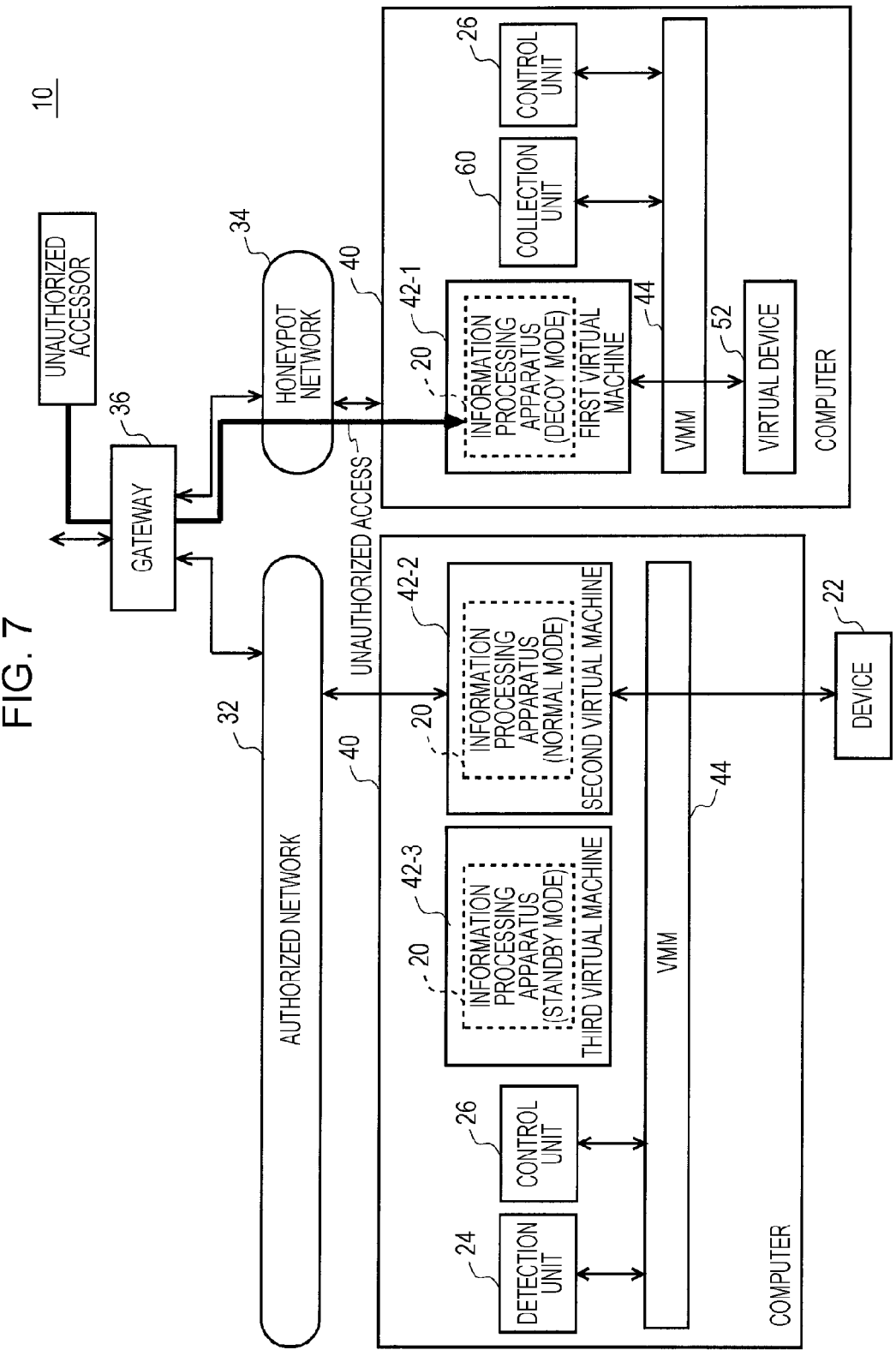
FIG. 7 illustrates a configuration of the computing system according to a modification of the embodiment, for use when unauthorized access is made in the computing system.

FIG. 7 illustrates a configuration of the computing system 10 according to a modification of the embodiment, for use when unauthorized access is made in the computing system 10. Since the computing system 10 according to this modification includes substantially the same functions and configurations as those of the computing system 10 described with reference to FIG. 1 to FIG. 6, only differences will be described below by attaching the same references to components having substantially the same functions and configurations.

The computing system 10 according to this modification further includes a collection unit 60. The collection unit 60 collects information regarding unauthorized access to the information processing apparatus 20 operating in the decoy mode. The collection unit 60 analyzes information for identifying unauthorized accessors or the like, for example.

On a condition that a predetermined type of information can be collected for the unauthorized access (e.g., information regarding the unauthorized accessors can be detected), the control unit 26 stops execution of the information processing apparatus 20 operating in the decoy mode. The computing system 10 according to such a modification can effectively use resources since execution of the information processing apparatus 20 operating in the decoy mode does not have to be continued for a long period.

Additionally, in this modification, the information processing apparatus 20 is an apparatus that controls the device 22. The information processing apparatus 20 performs control so that the device 22 is set to a reference state at predetermined intervals. For example, the information processing apparatus 20 performs control so that the state of the device 22 returns to an initial state at predetermined intervals (e.g., at intervals of several tens of minutes).

On a condition that unauthorized access to the information processing apparatus 20 implemented by the first virtual machine 42-1 is detected, the control unit 26 shifts the information processing apparatus 20 implemented by the first virtual machine 42-1 from the normal mode into another mode (probing mode or decoy mode) and shifts the information processing apparatus 20 implemented by the second virtual machine 42-2 from the standby mode into the normal mode, at a timing at which the device 22 is set to be in the reference state. For example, on a condition that the detection unit 24 detects unauthorized access, the control unit 26 shifts the mode of the information processing apparatuses 20 at a timing at which the device 22 returns to the initial state. This allows the computing system 10 according to this modification to reduce the influence of switching of the information processing apparatuses 20 on the control target.

Moreover, in this modification, the control unit 26 may collect behavior of the information processing apparatus 20 operating in the probing mode and cause the information processing apparatus 20 operating in the decoy mode to perform the collected behavior. For example, the control unit 26 collects behavior of input data input to the information processing apparatus 20 operating in the probing mode, behavior of the virtual device 52 controlled by the information processing apparatus 20 operating in the probing mode, and so forth. The control unit 26 then reflects the collected behavior of the input data and the virtual device 52 onto the information processing apparatus 20 operating in the decoy mode. This allows the computing system 10 according to this modification to deceive unauthorized accessors for a longer period.

Figure 8:
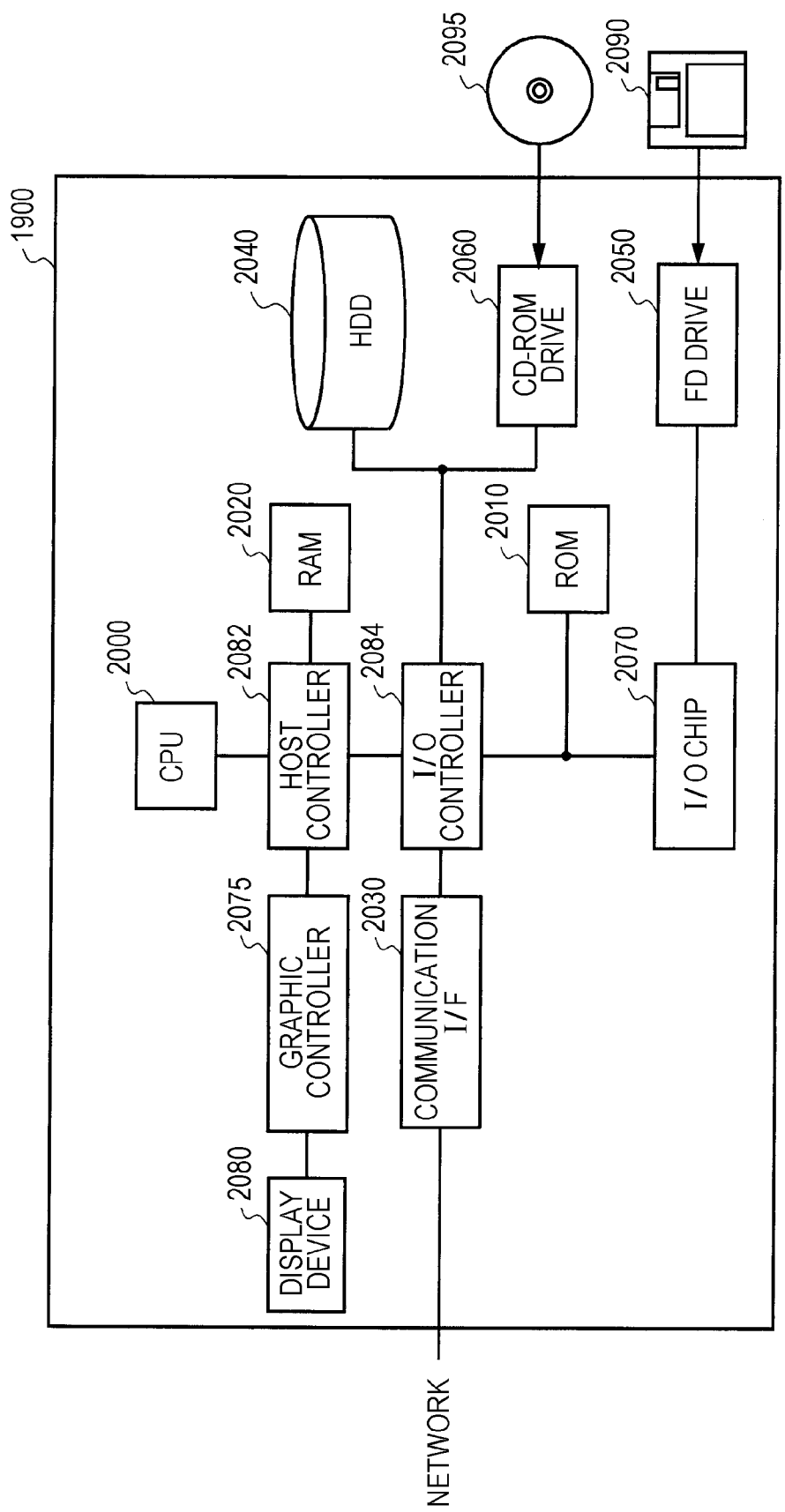
FIG. 8 illustrates an example of a hardware configuration of a computer according to the embodiment.

FIG. 8 illustrates an example of a hardware configuration of a computer 1900 according to the embodiment. The computer 1900 according to the embodiment includes a central processing unit (CPU) peripheral section, an input/output (I/O) section, and a legacy I/O section. The CPU peripheral section includes a CPU 2000, a random access memory (RAM) 2020, a graphic controller 2075, and a display device 2080 that are connected to each other via a host controller 2082. The I/O section includes a communication interface (I/F) 2030, a hard disk drive (HDD) 2040, and a compact disc-read only memory (CD-ROM) drive 2060 that are connected to the host controller 2082 via an I/O controller 2084. The legacy I/O section includes a ROM 2010, a flexible disk (FD) drive 2050, and an I/O chip 2070 that are connected to the I/O controller 2084.

The host controller 2082 connects the RAM 2020 to the CPU 2000 and the graphic controller 2075 that access the RAM 2020 at high transfer rates. The CPU 2000 operates based on programs stored in the ROM 2010 and the RAM 2020 to perform control of each component. The graphic controller 2075 acquires image data generated by the CPU 2000 or the like in a frame buffer provided in the RAM 2020 and displays the image data on the display device 2080. Alternatively, the graphic controller 2075 may include a frame buffer therein that stores image data generated by the CPU 2000 or the like.

The I/O controller 2084 connects the host controller 2082 to the communication interface 2030, the hard disk drive 2040, and the CD-ROM drive 2060 that are relatively high-speed I/O devices. The communication interface 2030 communicates with another apparatus via a network. The hard disk drive 2040 stores programs and data used by the CPU 2000 in the computer 1900. The CD-ROM drive 2060 reads programs or data from a CD-ROM 2095 and supplies the program or the data to the hard disk drive 2040 via the RAM 2020.

The I/O controller 2084 is also connected to the ROM 2010, the flexible disk drive 2050, and the I/O chip 2070 that are relatively low-speed I/O devices. The ROM 2010 stores a boot program executed at the time of booting of the computer 1900 and/or programs depending on hardware of the computer 1900. The flexible disk drive 2050 reads programs or data from a flexible disk 2090 and supplies the programs or the data to the hard disk drive 2040 via the RAM 2020. The I/O chip 2070 connects the flexible disk drive 2050 to the I/O controller 2084 and also connects various I/O devices to the I/O controller 2084 via, for example, a parallel port, a serial port, a keyboard port, a mouse port, and so forth.

The programs supplied to the hard disk drive 2040 via the RAM 2020 are stored on a recording medium, such as the flexible disk 2090, the CD-ROM 2095, or an IC card, and are provided to a user. The programs are read from the recording medium, installed into the hard disk drive 2040 in the computer 1900 via the RAM 2020, and executed in the CPU 2000.

A program that is installed into the computer 1900 and causes the computer 1900 to function as the computing system 10 includes a detection module and a control module. The program or modules control the CPU 2000 or the like to cause the computer 1900 to function as the computing system 10.

Information processing written in the program is loaded to the computer 1900, thereby functioning as the detection unit 24 and the control unit 26, which are concrete means resulting from cooperation of software and the aforementioned various hardware resources. These concrete means implement calculation or processing of information according to the usage of the computing system 10 in this embodiment, whereby the characteristic computing system 10 according to the usage is created.

For example, when the computer 1900 performs communication with an external apparatus or the like, the CPU 2000 executes a communication program loaded to the RAM 2020 and instructs the communication interface 2030 to perform communication processing based on processing content written in the communication program. Under control of the CPU 2000, the communication interface 2030 reads transmission data stored in a transmission buffer or the like provided in a storage device, such as the RAM 2020, the hard disk drive 2040, the flexible disk 2090, or the CD-ROM 2095, and transmits the transmission data to the network, or the communication interface 2030 writes reception data received from the network in a reception buffer or the like provided in the storage device. In this way, the communication interface 2030 may transfer transmission/reception data from and to the storage device using the direct memory access (DMA) method. Alternatively, the CPU 2000 reads data from a storage device or the communication interface 2030 at a transfer source, and writes the data in the communication interface 2030 or a storage device at a transfer destination, whereby transmission/reception data may be transferred.

Moreover, the CPU 2000 loads all or a necessary part of a file or a database stored in an external storage device, such as the hard disk drive 2040, the CD-ROM drive 2060 (CD-ROM 2095), or the flexible disk drive 2050 (flexible disk 2090), into the RAM 2020 using the DMA transfer or the like. Then, the CPU 2000 performs various types of processing on the data in the RAM 2020. Then, the CPU 2000 writes the processed data back to the external storage device using the DMA transfer or the like. In such processing, since the RAM 2020 can be considered to temporarily store the content of the external storage device, the RAM 2020, the external storage device, and the like are collectively referred to as a memory, a storage unit, or a storage device in the embodiment. Various types of information, such as various programs, data, tables, and databases, in the embodiment are stored in such a storage device and subjected to information processing. The CPU 2000 may store a part of data of the RAM 2020 in a cache memory and perform read and write operations on the cache memory. Even in such an embodiment, since the cache memory undertakes some of the functions of the RAM 2020, it is assumed in the embodiment that the cache memory is included in the RAM 2020, a memory, and/or a storage device, unless otherwise noted.

Moreover, the CPU 2000 performs, on data read from the RAM 2020, various types of processing specified by an instruction sequence in a program. The various types of processing include various types of calculation, processing of information, condition determination, and retrieval and replacement of information described in the embodiment.

Then, the CPU 2000 writes the processed data back to the RAM 2020. For example, when the CPU 2000 performs condition determination, the CPU 2000 compares each of the various variables shown in the embodiment with another variable or a constant and determines whether a condition is satisfied. The condition includes, for example, whether the variable is greater than the other variable or the constant, whether the variable is less than the other variable or the constant, whether the variable is equal to or greater than the other variable or the constant, whether the variable is equal to or less than the other variable or the constant, and whether the variable is equal to the other variable or the constant. When the condition is satisfied (or is not satisfied), the process branches to a different instruction sequence, or a subroutine is called.

Additionally, the CPU 2000 can search for information stored in files or databases stored in storage devices. For example, when a plurality of entries, in each of which an attribute value of a second attribute is associated with an attribute value of a first attribute, are stored in a storage device, the CPU 2000 searches for an entry whose attribute value of the first attribute satisfies a specified condition from the plurality of entries stored in the storage device and reads the attribute value of the second attribute stored in the entry, thereby being able to acquire the attribute value of the second attribute associated with the first attribute satisfying the predetermined condition.

The above-described programs or modules may be stored on an external recording medium. Other than the flexible disk 2090 and the CD-ROM 2095, for example, an optical recording medium such as a DVD or a CD, a magneto-optical recording medium such as an MO, a tape medium, or a semiconductor memory such as an IC card may be used as the recording medium. Moreover, a storage device, such as a hard disk or a RAM, provided in a server system connected to a private communication network or the Internet may be used as the recording medium, and the programs may be supplied to the computer 1900 via the network.

While the present invention has been described using the embodiment, the technical scope of the present invention is not limited to the scope of the description of the aforementioned embodiment. It is obvious to persons skilled in the art that various changes or improvements can be made in the aforementioned embodiment. It is obvious from the description of the claims that such changes or improvements are also included in the technical scope of the present invention.

It should be noted that, regarding the execution order of processes such as operations, procedures, steps, and stages in the devices, the systems, the programs, and the methods described in the claims, the specification, and the drawings, expression such as "before" and "prior to" is not explicitly given, and the devices, the systems, the programs, and the methods can be implemented in any order unless the output of a preceding process is used by a following process. Even when operation flows in the claims, the specification, and the drawings are described using expression such as "first" and "next" for convenience, this does not mean that such order is required.

REFERENCE NUMERALS

- 10: computing system
- 20: information processing apparatus
- 22: device
- 24: detection unit
- 26: control unit
- 32: authorized network
- 34: honeypot network
- 36: gateway
- 40: computer
- 42: virtual machine
- 44: virtual machine manager
- 52: virtual device
- 60: collection unit
- 1900: computer
- 2000: CPU
- 2010: ROM
- 2020: RAM
- 2030: communication interface
- 2040: hard disk drive
- 2050: flexible disk drive
- 2060: CD-ROM drive
- 2070: I/O chip
- 2075: graphic controller
- 2080: display device
- 2082: host controller
- 2084: I/O controller
- 2090: flexible disk
- 2095: CD-ROM

The invention claimed is:

1. A method for providing protection against unauthorized access to a system including a plurality of information processing apparatuses, an authorized network configured to transfer authorized access to the plurality of information processing apparatuses from an external network, and a honeypot network configured to transfer unauthorized access to the plurality of information processing apparatuses from the external network, the method comprising:

detecting, with a detection unit implemented in a computer, unauthorized access to a first of the plurality of information processing apparatuses that are virtually implemented by virtual machines executed by the computer; and connecting, with a control unit implemented in the computer, a second of the plurality of information processing apparatuses for which no unauthorized access has been detected to the authorized network, and connecting the first of the plurality of information processing apparatuses for which unauthorized access has been detected to the honeypot network;

wherein, in response to detecting unauthorized access in the detection step, the first of the plurality of information processing apparatuses is shifted into a decoy mode in which the detected unauthorized access is disconnected from a normal operation;

wherein the computer executes a first virtual machine and a second virtual machine that virtually implement the plurality of information processing apparatuses;

on a condition that the system is operating normally, the control unit causes the information processing apparatus implemented by the first virtual machine to operate in a normal mode and causes the information processing apparatus implemented by the second virtual machine to operate in a standby mode in which the information processing apparatus is on standby to perform processing; and wherein, on a condition that unauthorized access to the information processing apparatus implemented by the first virtual machine is detected, the control unit shifts the information processing apparatus implemented by the first virtual machine from the normal mode into the decoy mode and shifts the information processing apparatus implemented by the second virtual machine from the standby mode into the normal mode.

2. The method according to claim 1, wherein the control unit causes the computer to execute the first virtual machine that implements the information processing apparatus operating in the decoy mode, the computer being different from the computer executing the second virtual machine that implements the information processing apparatus operating in the normal mode.

3. The method according to claim 1, wherein:
on a condition that unauthorized access is suspected for the information processing apparatus operating in the normal mode, the control unit shifts the information processing apparatus implemented by the first virtual machine from the normal mode into a probing mode in which the information processing apparatus inputs data used in the normal operation to an input port and operates in a state where an output port is disconnectable from the normal operation; and
on a condition that unauthorized access to the information processing apparatus operating in the probing mode is detected, the control unit shifts the information processing apparatus implemented by the first virtual machine from the probing mode into the decoy mode.

4. The method according to claim 3, wherein the control unit causes a computer to execute the first virtual machine that implements the information processing apparatus operating in the probing mode, the computer being the same as the computer executing the second virtual machine that implements the information processing apparatus operating in the normal mode.

5. The method according to claim 3, wherein the control unit collects behavior of the information processing apparatus operating in the probing mode, and causes the information processing apparatus operating in the decoy mode to perform the collected behavior.

6. The method according to claim 1, further comprising:
collecting, with a collection unit, information regarding unauthorized access to the information processing apparatus operating in the decoy mode.

7. The method according to claim 6, wherein the control unit stops execution of the information processing apparatus operating in the decoy mode on a condition that a predetermined type of information is collected for the unauthorized access.

8. The method according to claim 1, wherein:
the one or more information processing apparatuses are apparatuses that control a device, and set the device in a reference state at predetermined intervals, and
on a condition that unauthorized access to the information processing apparatus implemented by the first virtual machine is detected, the control unit shifts the information processing apparatus implemented by the first virtual machine from the normal mode into another mode and shifts the information processing apparatus implemented by the second virtual machine from the standby mode into the normal mode, at a timing at which the device is set to be in the reference state.

* * * * *